US012705974B2

(12) United States Patent
Bradley et al.

(10) Patent No.: US 12,705,974 B2
(45) Date of Patent: Aug. 11, 2026

(54) SYSTEM AND METHOD FOR ROAD TRAFFIC PATTERN CALCULATION

(71) Applicant: HERE Global B.V., Eindhoven (NL)

(72) Inventors: Corinne Bradley, Chicago, IL (US); Arnold Sheynman, Northbrook, IL (US); Kyle Jackson, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 171 days.

(21) Appl. No.: 18/376,611

(22) Filed: Oct. 4, 2023

(65) Prior Publication Data

US 2025/0118198 A1 Apr. 10, 2025

(51) Int. Cl.
*G08G 1/01* (2006.01)
*G01C 21/00* (2006.01)

(52) U.S. Cl.
CPC ....... *G08G 1/0129* (2013.01); *G01C 21/3815* (2020.08); *G08G 1/0133* (2013.01)

(58) Field of Classification Search
None
See application file for complete search history.

(56) References Cited

U.S. PATENT DOCUMENTS

| | | | | |
|---|---|---|---|---|
| 8,452,771 | B2 | 5/2013 | Kurciska et al. | |
| 8,615,354 | B2 | 12/2013 | Barker et al. | |
| 8,700,294 | B2 | 4/2014 | Downs et al. | |
| 9,489,838 | B2 | 11/2016 | Fowe et al. | |
| 2010/0076671 | A1 * | 3/2010 | Pryakhin | G08G 1/096811 701/119 |
| 2016/0275404 | A1 * | 9/2016 | Abraham | G08G 1/202 |
| 2016/0284212 | A1 * | 9/2016 | Tatourian | G08G 1/096775 |

* cited by examiner

*Primary Examiner* — James M McPherson
*Assistant Examiner* — Bakari Underwood
(74) *Attorney, Agent, or Firm* — DITTHAVONG, STEINER & MLOTKOWSKI

(57) ABSTRACT

The disclosure provides a traffic pattern data calculation system, a method and a computer program product for calculating traffic pattern data. The traffic pattern data calculation system is configured to receive, for a road segment, historical traffic data and complementary data, for a predefined time window. The traffic pattern data calculation system is configured to extract from the received historical traffic data and the complementary data, secondary traffic data based on a filtering criterion. The traffic pattern data calculation system is configured to calculate the traffic pattern data for the road segment based on the extracted secondary traffic data. In addition, the traffic pattern data calculation system is configured to update a map database with the traffic pattern data of the road segment based on the calculation.

20 Claims, 5 Drawing Sheets

SYSTEM AND METHOD FOR ROAD TRAFFIC PATTERN CALCULATION

TECHNOLOGICAL FIELD

The present disclosure relates to road traffic pattern calculation and more particularly relates to a system and a method for calculating the road traffic pattern based on an adaptive time window.

BACKGROUND

With recent advancements in navigation systems, there has been significant development of maps. The maps may be utilized in various devices, such as computers, vehicle infotainment systems, and smart phones. The maps may provide navigation instructions using road traffic patterns. The road traffic patterns are created from vehicular probe data to represent typical conditions on a road. In an example, the navigation instructions that specify the road traffic patterns may be needed for timely delivery of goods by logistics providers as the logistics providers need accurate road traffic patterns in order to optimize route plans for delivery of the goods. Furthermore, the road traffic patterns may be created at a road segment level for different days of week and different times. The different times may correspond to time windows with epochs, such as a 15-minute time epoch. As an example, a road segment may have a speed value for a given day, such as Monday for the time window of 8:00 am-8:15 am, representing a typical pattern of speed of vehicles on the road.

Typically, the road traffic patterns are created from a multi-year average of the vehicular probe data. The multi-year average of the vehicular probe data may be well-suited to give a generalized road traffic pattern. However, such a road traffic pattern may be too generalized to account for recent patterns (for a short duration) at a same location on the road. As an example, a recent pattern may correspond to a road construction that may block road lanes and may lead to congestion of traffic and slow speeds of the vehicles at a location on the road. A multi-year road traffic pattern may not accurately reflect the changes in the speed of the vehicles due to the recent patterns, such as the road construction. Thus, the conventional generalized road traffic pattern may be inaccurate.

As per the ongoing discussion, there exists a need for an efficient and adaptive system and method to calculate accurate road traffic patterns.

SUMMARY OF THE INVENTION

In order to solve the foregoing problem, an aspect of the present invention provides a traffic pattern data calculation system. The traffic pattern data calculation system includes at least one non-transitory memory configured to store computer executable instructions and at least one processor (hereinafter referred as the processor) configured to execute the computer executable instructions. The processor is configured to receive, for a road segment, historical traffic data and complementary data, for a predefined time window. In addition, the processor is configured to extract secondary traffic data, from the received historical traffic data and the complementary data based on a filtering criterion. Further, the processor is configured to calculate traffic pattern data for the road segment, based on the extracted secondary traffic data. The processor is further configured to update a map database with the traffic pattern data of the road segment, based on the calculation.

According to an example embodiment, the processor is further configured to determine an advancing time interval for the predefined time window, based on one or more attributes of the road segment. In addition, the processor is configured to advance the predefined time window by the determined advancing time interval and calculates updated traffic pattern data for the road segment based on the advancement.

According to an example embodiment, the filtering criterion comprises at least one of complementary data that is calendar event data or non-recurring incident data, and the historic traffic data that is associated with a traffic confidence value that is less than or equal to a predefined traffic confidence threshold.

According to an example embodiment, to extract the secondary traffic data based on the filtering criterion, the processor is configured to exclude the historical traffic data corresponding to the complementary data and combine the historical traffic data associated with the traffic confidence value more than the predefined traffic confidence threshold.

According to an example embodiment, the combining comprises an arithmetic averaging based on a recurrent formula.

According to an example embodiment, the traffic pattern data comprises a speed value and a traffic congestion parameter value.

According to an example embodiment, the one or more attributes of the road segment comprise at least one of: a functional classification of the road segment or a controlled access limitation associated with the road segment.

Another aspect of the present invention provides a method for calculation of the traffic pattern data. The method includes receiving, for a road segment, historical traffic data and complementary data, for a predefined time window. The method includes extracting, from the received historical traffic data and the complementary data, secondary traffic data based on a filtering criterion. The method includes calculating, for the road segment, the traffic pattern data, based on the extracted secondary traffic data. The method further includes updating the map database with the traffic pattern data of the road segment, based on the calculation.

According to an example embodiment, the method includes determining the advancing time interval for the predefined time window, based on the one or more attributes of the road segment. In addition, the method includes advancing the predefined time window by the determined advancing time interval. Further, the method includes calculating updated traffic pattern data for the road segment based on the advancement.

According to an example embodiment, the filtering criterion comprises at least one of the complementary data that is calendar event data and non-recurring incident data. In addition, the filtering criterion includes the historical traffic data that is associated with the traffic confidence value that is less than or equal to the predefined traffic confidence threshold.

According to an example embodiment, for extracting the secondary traffic data, the method includes excluding the historical traffic data corresponding to the complementary data and combining the historical traffic data associated with the traffic confidence value more than the predefined traffic confidence threshold.

According to an example embodiment, the combining comprises an arithmetic averaging based on a recurrent formula.

Yet another aspect of the present invention provides a computer programmable product comprising a non-transitory computer readable medium having stored thereon computer executable instruction which when executed by one or more processors, cause the one or more processors to carry out operations for calculating traffic pattern data, the operations include receiving, for a road segment, historical traffic data and complementary data, for a predefined time window. The operations include extracting, from the received historical traffic data and the complementary data, secondary traffic data based on a filtering criterion. In addition, the operations include calculating, for the road segment, the traffic pattern data, based on the extracted secondary traffic data. The operations include updating a map database with the traffic pattern data of the road segment, based on the calculation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The present invention is illustrated by way of example and not by way of limitation in the figures of the accompanying drawings, in which the like reference numerals indicate like elements and in which.

DETAILED DESCRIPTION

Figure 1A:
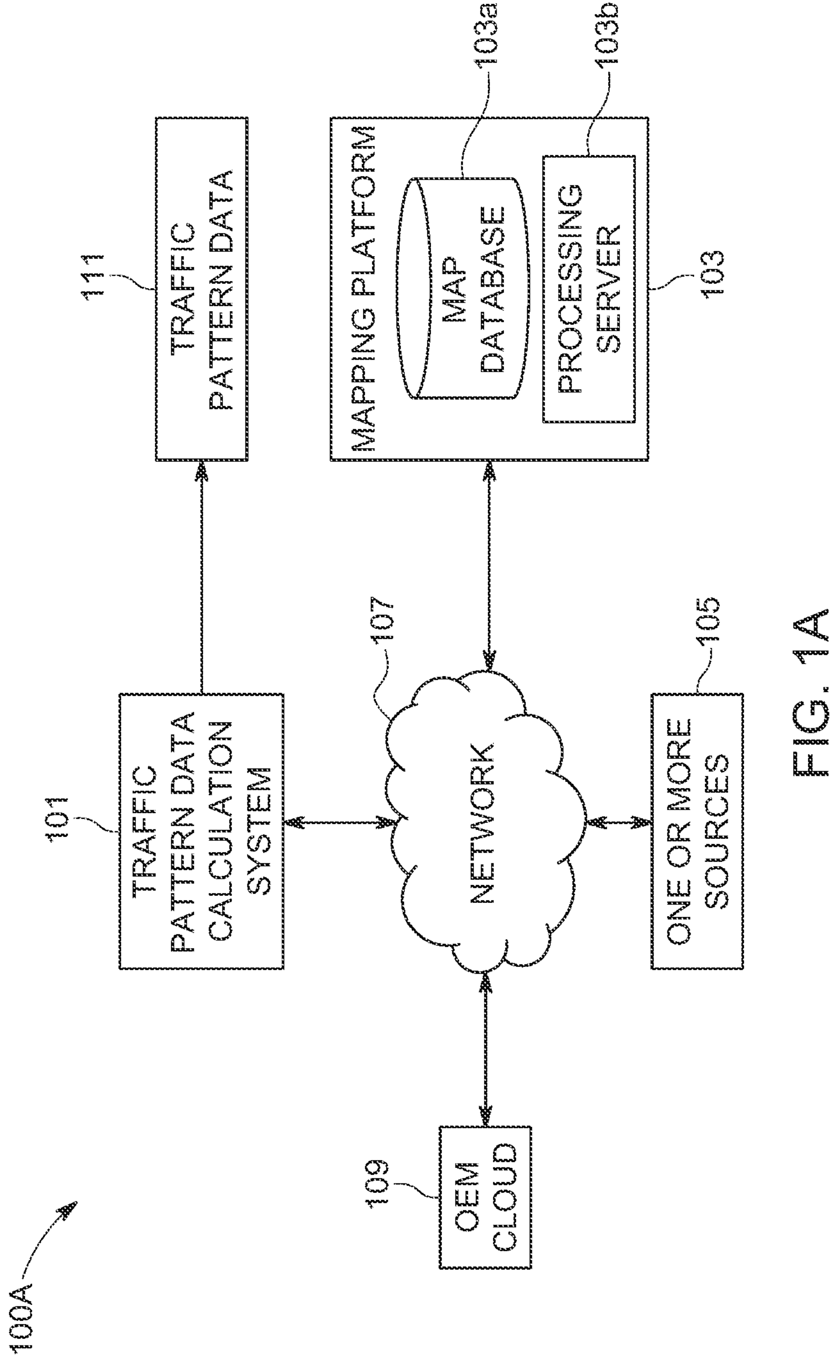
FIG. 1A illustrates a network environment of a traffic pattern data calculation system, in accordance with an example embodiment.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A traffic pattern data calculation system, a method, and a computer programmable product are provided herein, in accordance with an example embodiment for calculating traffic pattern data. Conventionally, the traffic patterns are created from a multi-year average of vehicular probe data. The multi-year average of the vehicular probe data may be well-suited to give a generalized traffic pattern of a road segment. However, such a traffic pattern may be too generalized to account for recent patterns at a same location on the road segment. As an example, a micro pattern may correspond to a road construction that may block road lanes and may lead to congestion of traffic and slow speeds of the vehicles at a location on the road segment. A multi-year road traffic pattern may not accurately reflect the changes in the speed of the vehicles due to the micro patterns, such as the road construction. To determine traffic pattern of recent time periods when traffic volumes have changed significantly (such as long term road construction) or there has been a seasonal change, shorter duration of traffic data is required rather than multi-year traffic data as the multi-year traffic data is too generalized and recent changes are not captured. Thus, the conventional generalized road traffic pattern may be inaccurate.

On the other hand, the proposed traffic pattern calculation system is developed for calculating recent road traffic patterns especially for short duration predefined windows of time, such as 3 weeks, to overcome the above stated problem of non-detection of recent changes in traffic pattern data. For example, traffic congestion levels have changed significantly during COVID-19, when cities and countries were locked down. In such cases, recent traffic history becomes much more reflective of true traffic than the traffic history of longer duration. Thus, the proposed traffic pattern calculation system provides accurate traffic pattern data by calculating the recent road traffic patterns of short durations. The recent road traffic patterns may be updated in digital maps that may be utilized for timely delivery of goods by logistics providers as the logistics providers need accurate recent road traffic patterns in order to optimize their route plans for delivery of goods.

FIG. 1A illustrates a network environment 100A of a traffic pattern data calculation system 101, in accordance with an example embodiment. The traffic pattern data calculation system 101 may be communicatively coupled to a mapping platform 103, one or more sources 105 and an OEM (Original Equipment Manufacturer) cloud 109 via a network 107. The mapping platform 103 may further include a map database 103*a* and a processing server 103*b*.

The traffic pattern data calculation system 101 is configured to calculate traffic pattern data 111 using historical traffic data, calendar event data and non-recurring incident data received from the one or more sources 105 for a predefined time window. In an embodiment, the predefined window has a configurable duration, for example it may be set to 3 weeks, 1 month, 2 months, 1 week, and the like. The traffic pattern data calculation system 101 may be further configured to update the map database 103*a* with the calculated traffic pattern data 111.

The traffic pattern data calculation system 101 may be communicatively coupled to the components shown in FIG. 1A to carry out the desired operations and wherever required modifications may be possible within the scope of the present disclosure. The traffic pattern data calculation system 101 may be a standalone unit configured to calculate the traffic pattern data 111 for a road segment for a predefined time window. Alternatively, the traffic pattern data calculation system 101 may be coupled with an external device such as the one or more sources 105. In some example embodiments, the traffic pattern data calculation system 101 may be any user accessible device such as a mobile phone, a smartphone, a portable computer, and the like that are portable in themselves or as a part of another portable/mobile object such as a vehicle. The traffic pattern data calculation system 101 may comprise a processor, a memory, and a communication interface. The processor, the memory and the communication interface may be communicatively coupled to each other. The traffic pattern data calculation system 101 may comprise a processing means such as a central processing unit (CPU), storage means such as on-board read only memory (ROM) and random access memory (RAM), and other components as may be required for specific functionalities of the traffic pattern data calculation system 101. Additional, different, or fewer components may be provided. For example, the traffic pattern data calculation system 101 may be implemented in a server, such as a cloud-based server.

Figure 1B:
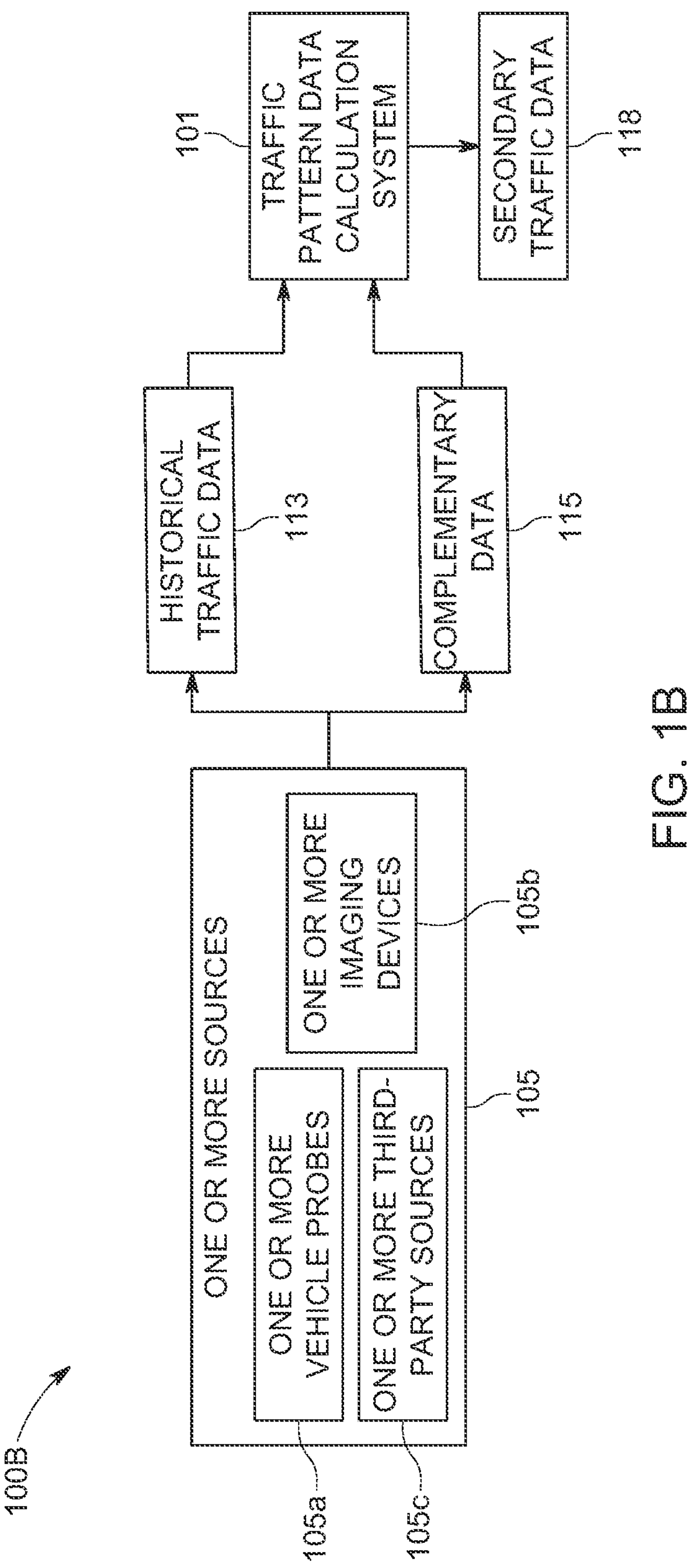
FIG. 1B illustrates a block diagram for generation of secondary traffic data, in accordance with an example embodiment.

The one or more sources 105 may include, but may not be limited to, one or more vehicle probes, one or more imaging devices, and one or more third-party sources (shown in FIG. 1B). The one or more sources 105 are configured to capture the historical traffic data and the complementary data associated with the road segment. The traffic pattern data calculation system 101 may receive the historical traffic data and the complementary data from the one or more sources 105 via the network 107.

The traffic pattern data 111 may be calculated by the traffic pattern data calculation system 101 based on the historical traffic data and the complementary data. In an embodiment, the traffic pattern data 111 may include a speed value associated with the one or more vehicle probes travelling on the road segment. In another embodiment, the traffic pattern data 111 may include a traffic congestion parameter value associated with an amount of traffic congestion on the on the road segment.

In operation, to calculate the traffic pattern data 111 for each day, each day may be divided into several time windows (or epochs). For example, an epoch may be 15 minutes in duration. Thus, for each day, multiple 15 minutes epochs may be created to calculate the traffic pattern. In an example scenario, to calculate the traffic pattern data 111 for a given day (such as a Monday), Monday may be divided into epochs such as 08:00 AM to 08:15 AM, 08:15 AM to 08:30 AM, 08:30 AM to 08:45 AM, and so forth. Therefore, for each of the epochs, the traffic pattern data 111 may be calculated. In another embodiment, the epochs may be different than the 15 minutes epochs, such as 30 minute epochs, 60 minute epochs, and so forth.

As the traffic pattern data calculation system 101 enables calculation of the traffic pattern data 111 by considering short duration traffic patterns, instead of the year-long traffic patterns, the traffic pattern data calculation system 101 may predefine a short duration time window. For example, the predefined time window may be 3 weeks.

The traffic pattern data calculation system 101 may be configured to receive the historical traffic data and complementary data, for the predefined time window for a road segment. The historical traffic data may include speed data of one or more vehicle probes travelling on the road segment and traffic congestion levels for the predefined time window. In an embodiment, the complementary data may be calendar event data and non-recurring incident data. The calendar event data may include data associated with events such as festivals, a national holiday (such as Independence Day), school calendar events (such as sports day), and the like. The non-recurring incident data may correspond to traffic incident reports such as an accident. Details of the reception of the historical traffic data and complementary data are further provided, for example, in FIG. 1B.

The traffic pattern data calculation system 101 may be further configured to extract secondary traffic data from the received historical traffic data and the complementary data based on a filtering criterion. In an embodiment, the filtering criterion comprises exclusion of the historical traffic data associated with a traffic confidence value that is less than or equal to a predefined traffic confidence threshold and combining of the historical traffic data associated with the traffic confidence value more than the predefined traffic confidence threshold. The traffic confidence value is a measure of the amount of input data (such as probe vehicle) received for a given time and location. The secondary traffic data may include the historical traffic data associated with the traffic confidence value more than the predefined threshold. For example, the secondary traffic data may include the speed values included in the historical traffic data, such that the traffic confidence value associated with the speed values is more than the predefined threshold. Details of the extraction of the secondary traffic data are further provided, for example, in FIG. 1B.

The traffic pattern data calculation system 101 may be further configured to calculate the traffic pattern data 111 for the road segment, based on the extracted secondary data. Furthermore, the traffic pattern data calculation system 101 may be configured to update the map database 103*a* with the calculated traffic pattern data 111. Details of the calculation of the traffic pattern data 111 and update of the map database 103*a* are further provided for example, in FIG. 2.

FIG. 1B illustrates a block diagram 100B for generation of secondary traffic data 118, in accordance with an example embodiment. The block diagram 100B may include the traffic pattern data calculation system 101, the one or more sources 105, historical traffic data 113, complementary data 115, and the secondary traffic data 118.

The one or more sources 105 may further include one or more vehicle probes 105*a*, one or more imaging devices 105*b*, and one or more third-party sources 105*c*. In an example, the one or more vehicle probes 105*a* are such vehicles that participate in traffic flow and are capable of determining experienced traffic conditions and transmitting these to a traffic center. In addition, the one or more vehicle probes 105*a* are used for traffic operations monitoring, incident detection, and route guidance applications. In an embodiment, each of the one or more vehicle probes 105*a* is traveling on the road segment. In an example, the one or more vehicle probes 105*a* captures the historical traffic data 113 such as road segment average speed, and traffic congestion levels for the road segment. In other words, the historical traffic data is captured though the one or more vehicle probes 105*a*.

The one or more imaging devices 105*b* may correspond to cameras installed on a roadside to capture traffic conditions on the road segment. For example, cameras may be at least one of closed-circuit televisions (CCTVs), 360 degree cameras, wide-angled cameras, portable video cameras and the like. In an embodiment, the one or more imaging devices 105*b* are utilized to capture the complementary data 115 such as non-recurring incident data. In an example, non-recurring incident data is associated with traffic incident data such as accidents, rallies, calendar events, national holidays, and the like.

Moreover, the one or more third-party sources 105*c* may correspond to at least one of or a combination of database, internet, and the like. In an example, the one or more third-party sources 105*c* may be utilized to capture the complementary data 115 such as calendar event data for the predefined time window. The calendar event data may include data associated with events such as national holidays, festivals, public meetings, school events, and the like. The one or more sources 105 (the one or more vehicle probes 105*a*, one or more imaging devices 105*b*, and one or more third-party sources 105*c*) are connected with the traffic pattern data calculation system 101 via the network 107.

The traffic pattern data calculation system 101 may be configured to receive the historical traffic data 113 for the predefined time window from the one or more vehicle probes 105*a*. The traffic pattern data calculation system 101 may be configured to receive the complementary data 115 such as the non-recurring incident data for the predefined time window from the one or more imaging devices 105*b*. In addition, the traffic pattern data calculation system 101 may be configured to receive the complementary data 115 such as the calendar event data for the predefined time window from the one or more third-party sources 105*c*. In an example, the predefined time window has duration of about 3 weeks.

The historical traffic data 113 may include the speed data of each of the one or more vehicle probes 105*a*, average speed of the one or more vehicle probes 105*a*, traffic congestion levels on the road segment, and the like. In addition, the complementary data 115 corresponds to at least one of the calendar event data and the non-recurring incident data (as explained above).

The traffic pattern data calculation system 101 may be configured to extract the secondary traffic data 118 from the received historical traffic data 113 and the complementary data 115. The secondary traffic data 118 may include the speed values of one or more vehicles including the one or more vehicle probes 105*a* on the road segment for the predefined time window. The secondary traffic data 118 is extracted based on a filtering criterion. The filtering criterion comprises exclusion of the historical traffic data 113 associated with a traffic confidence value that is less than or equal to a predefined traffic confidence threshold. For example, the predefined traffic confidence threshold could be 0.85. The speed values received in the historical traffic data 113 that are associated with the traffic confidence value of less than 0.85 may be excluded as per the filtering criterion. For example, a number of speed values received in a specific epoch of 15 minutes may be less or insufficient, thus, the traffic confidence value of such number of speed values may be less than the predefined traffic confidence threshold of 0.85 due to lack of sufficient speed data. In such a case, these speed values of the historical traffic data 113 having the traffic confidence value less than the predefined traffic confidence threshold may be excluded.

Moreover, the filtering criterion comprises exclusion of the speed values corresponding to the complementary data 115. For example, the speeds of the one or more vehicles at a site of the accident on the road segment may be excluded. In another example, the speeds of the one or more vehicles in an area having a rally may be excluded.

Furthermore, the extraction of the secondary traffic data 118 may be based on combining of the historical traffic data 113 associated with the traffic confidence value more than the predefined traffic confidence threshold. For example, the number of speed values received in a specific epoch of 15 minutes may be sufficient in number. For example, the number of speed values may be received from 50 vehicles on the road segment. Thus, the traffic confidence value of such number of speed values may be more than the predefined traffic confidence threshold of 0.85. In such a case, these speed values of the historical traffic data 113 having the traffic confidence value more than the predefined traffic confidence threshold may be combined to extract the secondary traffic data 118.

In an embodiment, the combining of the historical traffic data 113 may include an arithmetic averaging of the speed values having the traffic confidence value to be more than the predefined traffic confidence threshold, based on a recurrent formula. Details of the arithmetic averaging of the speed values are further provided, for example, in FIG. 2.

Figure 2:
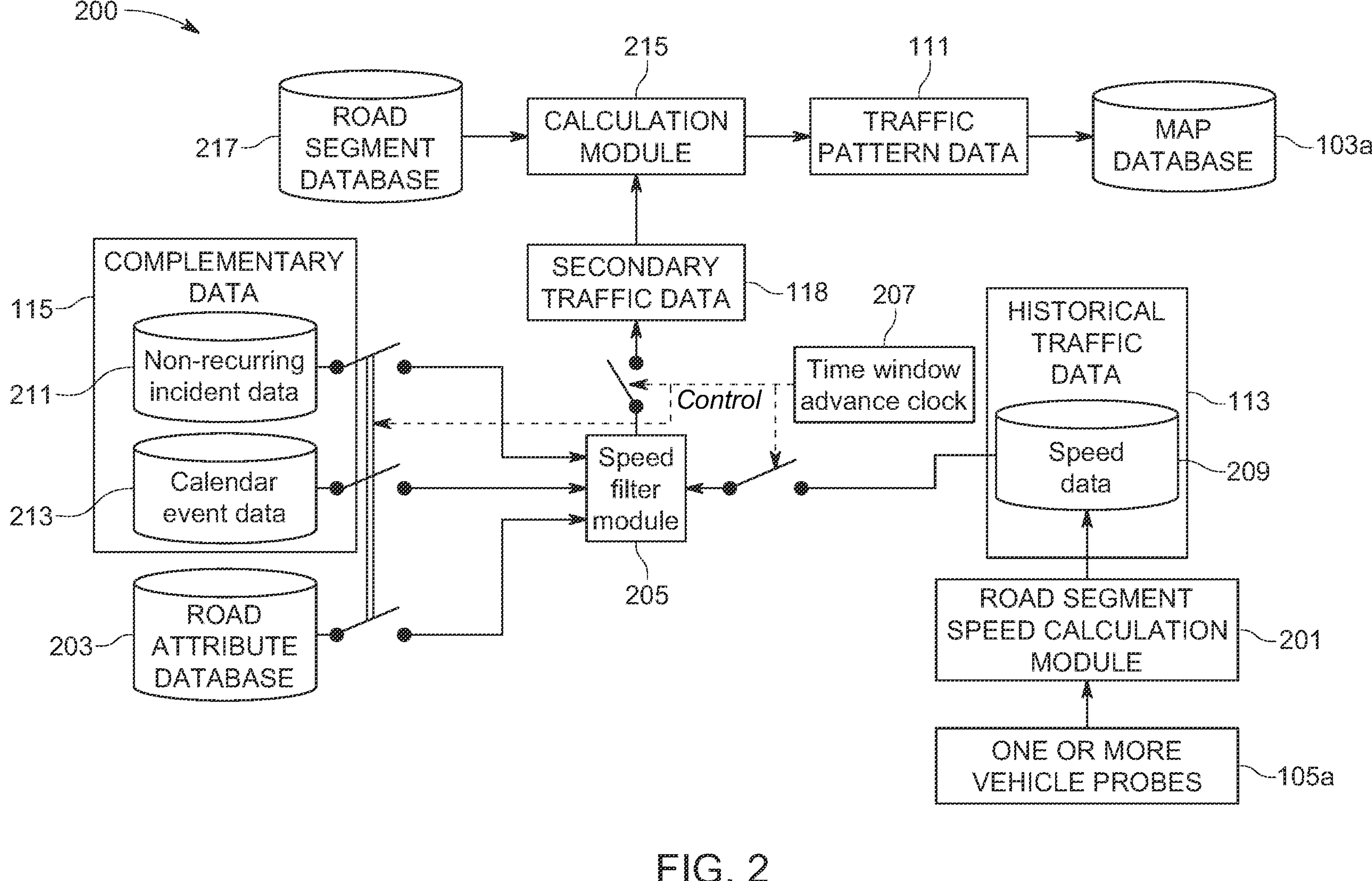
FIG. 2 illustrates a functional block diagram for calculating traffic pattern data, in accordance with an example embodiment.

FIG. 2 illustrates a functional block diagram 200 for calculating the traffic pattern data 111, in accordance with an example embodiment. The functional block diagram 200 of the traffic pattern data calculation system 101 includes a road segment speed calculation module 201, a road attribute database 203, a speed filter module 205, and a time window advance clock 207. The functional block diagram 200 further depicts the historical traffic data 113 that includes speed data 209. The functional block diagram 200 further depicts the complementary data 115 that includes non-recurring incident data 211 and calendar event data 213. The functional block diagram 200 further includes a calculation module 215 and a road segment database 217. In an embodiment, the speed filter module 205 and the calculation module 215 may be a part of the traffic pattern data calculation system 101.

The road segment speed calculation module 201 may perform speed calculation using one or more vehicle probes 105*a* to output the speed data 209 included in the historical traffic data 113. In an embodiment, the speed data 209 may include average speeds of the one or more vehicle probes 105*a*. The speed data 209 is further transmitted to the speed filter module 205. Further, the speed filter module 205 receives the complementary data 115 from the one or more imaging devices 105*b* and the one or more third-party sources 115*c*. The non-recurring incident data 211 is associated with traffic incident data such as accidents, rallies, and the like. The calendar event data includes but may not be limited to national holidays, festivals, and public meetings.

Furthermore, the speed filter module 205 receives one or more road attributes of the road segment from the road segment database 203. The one or more road attributes includes at least one of a functional classification of the road segment or a controlled access limitation associated with the road segment. In an example, the functional classification of the road segment may be interstates, minor arterials, collector streets, and local roads. The controlled access limitation may refer to conditions such as a road closure due to events such as accidents, or ongoing rallies.

The speed filter module 205 may be configured to apply the filtering criterion on the received historical traffic data 113 and the complementary data 115 to extract the secondary traffic data 118. In some embodiments, the traffic pattern data calculation system 101 may be further configured to determine an advancing time interval for the predefined time window based on the one or more road attributes of the road segment. The one or more road attributes of the road segment may be obtained from the road attribute database 203. In an example, if the road segment is an interstate highway, the predefined time window may be three weeks. If the road segment is an arterial, the predefined time window may be four weeks after advancing. In an embodiment, the predefined time window has duration of at least three weeks. In another embodiment, the advancing time interval corresponds to duration of at least one week.

The speed filter module 205 is connected with the time window advance clock 207. The time window advance clock 207 is configured to advance the predefined time window by the determined advancing time interval for the upcoming week. For example, the traffic pattern data needs to be calculated for 1st of December (i.e., a Thursday). In such a case, the historical traffic data 113 and the complementary data 115 for predefined time window of previous, for e.g., three weeks (10th November to 30th November) from the 1st of December are utilized. For example, the week corresponding to 10th November till 16th November, the week corresponding to 17th November till 23rd November and the week corresponding to corresponding to 24th November till 30th November may be utilized. Next, when the traffic pattern data needs to be calculated for 8th of December (such as a subsequent Thursday of the 1st of December), the predefined time window may be advanced by one week. In such a case, the week corresponding to 10th November till 16th November (such as a least recent week) may be excluded, and a most recent week corresponding to 1st December till 7th December is included in the predefined time window. The historical traffic data 113 and the complementary data 115 may be extracted for the recent three weeks, such as from 17th November till 7th December to calculate the traffic pattern data for the 8th of December. In such a manner, the predefined time window is updated on a rolling or a sliding basis, based on the requirement of the traffic pattern data. Thus, the least recent week (or weeks) are excluded, and most recent week (or weeks) are included in the predefined time window on the rolling basis to calculate the traffic pattern data. This may be done for calculating the traffic pattern data for any day.

The speed filter module 205 is further configured to extract the secondary traffic data 118 based on the filtering criterion. The filtering criterion comprises exclusion of the historical traffic data 113 associated with the traffic confidence value that is less than or equal to the predefined traffic confidence threshold and combining of the historical traffic data 113 associated with the traffic confidence value more than the predefined traffic confidence threshold. Further, the extraction of the secondary traffic data 118 includes combining the historical traffic data 113 associated with the traffic confidence value more than the predefined traffic confidence threshold. The combining comprises an arithmetic averaging of speed data based on a recurrent formula. In an example, the recurrent formula is given as below:

$$\bar{S}_{n+1}^{L} = \frac{1}{n+1}\left(n\bar{S}_{n}^{L} + s_{n+1}^{L}\right), \tag{1}$$

where $\bar{S}_{n}^{L}$– is an arithmetic average of speeds of the one or more vehicle probes 105*a* at the road segment L after n window advances, and $s_{n+1}^{L}$– is an arithmetic average of speeds at the road segment L at window advance n+1.

Further, the extracted secondary traffic data 118 is transmitted to the calculation module 215. In addition, the road segment database 217 may be utilized to collect information associated with the road segment such as location of the road segments. In an embodiment, the calculation module 215 is configured to calculate the traffic pattern data 111 based on the extracted secondary traffic data 118 for the predefined time window and for a particular time epoch (such as 15 minute time epoch). For example, if the traffic pattern data 111 needs to be calculated for 8th of December (Thursday) for the time epoch of 15 minutes, between 10 am to 10:15 am, then from previous 3 weeks data (the historical traffic data 113 and the complementary data 115) starting from 17th November till 7th December, every Thursday's traffic data is utilized for the time epoch between 10 am to 10:15 am for calculation of the traffic pattern data 111. In addition, out of the previous 3 weeks, first week is from 1st December to 7th December, second week is from 24th November to 30th November and third week is from 17th November to 23rd November. In an example, speeds of those vehicle probes are determined that are travelling in the time epoch between 10:00 am to 10:15 am. If the traffic confidence value of the speed values from the one or more vehicle probes 105*a* are less than the predefined traffic confidence threshold (for example, 0.85), then that speed data is excluded. Further, if the traffic confidence value of the speed values from the one or more vehicle probes 105*a* is more than the predefined traffic confidence threshold (for example, 0.85), then that speed data is combined using arithmetic average using the recurrent formula of equation 1.

In another embodiment, the traffic pattern data calculation system 101 may be further configured to update the traffic pattern data 111 based on the advancement of the predefined time window (e.g., three weeks) by the determined advanced time interval (e.g., one week). For example, if the traffic pattern data 111 needs to be calculated for 1st of December (Thursday) for the time epoch of 15 minutes, between 10 am to 10:15 am, then from previous, for example, 3 weeks data (the historical traffic data 113 and the complementary data 115) starting from 10th November till 7th December, every Thursday's traffic data is utilized for the time epoch between 10 am to 10:15 am for calculation of the updated traffic pattern data 111. Next, the traffic pattern data 111 needs to be calculated for 8th of December (Thursday) for the time epoch of 15 minutes, between 10 am to 10:15 am. In such a case, from previous, for example, 3 weeks data (the historical traffic data 113 and the complementary data 115) starting from 17th November till 7th December (excluding the week 10th November till 16th November), every Thursday's traffic data is utilized for the time epoch between 10 am to 10:15 am for calculation of the updated traffic pattern data 111 for the 8th of December.

The traffic pattern data 111 includes but may not be limited to the speed value and the traffic congestion parameter value. The speed value corresponds to average speed of one or more vehicles travelling on the road segment. The traffic congestion parameter value corresponds to average traffic congestion levels depicted by the one or more prove vehicles travelling on the road segment. The traffic pattern data 111 calculated by the calculation module 215 is sent to the map database 103*a* for updating map of the road segment. The traffic pattern data 111 may be represented using a histogram showing values of the parameter of interest, such as the speed value or the congestion value, as it varies over a variable, such as time. Similarly, the traffic pattern data 111 may be represented or used by the traffic pattern data calculation system 101 to reflect changes/variations in the traffic pattern data 111 of the road segment, using other equivalent representations. The map of the road segment is further utilized by one or more entities for travel purposes. The one or more entities include but may not be limited to drivers of the one or more vehicles, and logistics providers.

Figure 3:
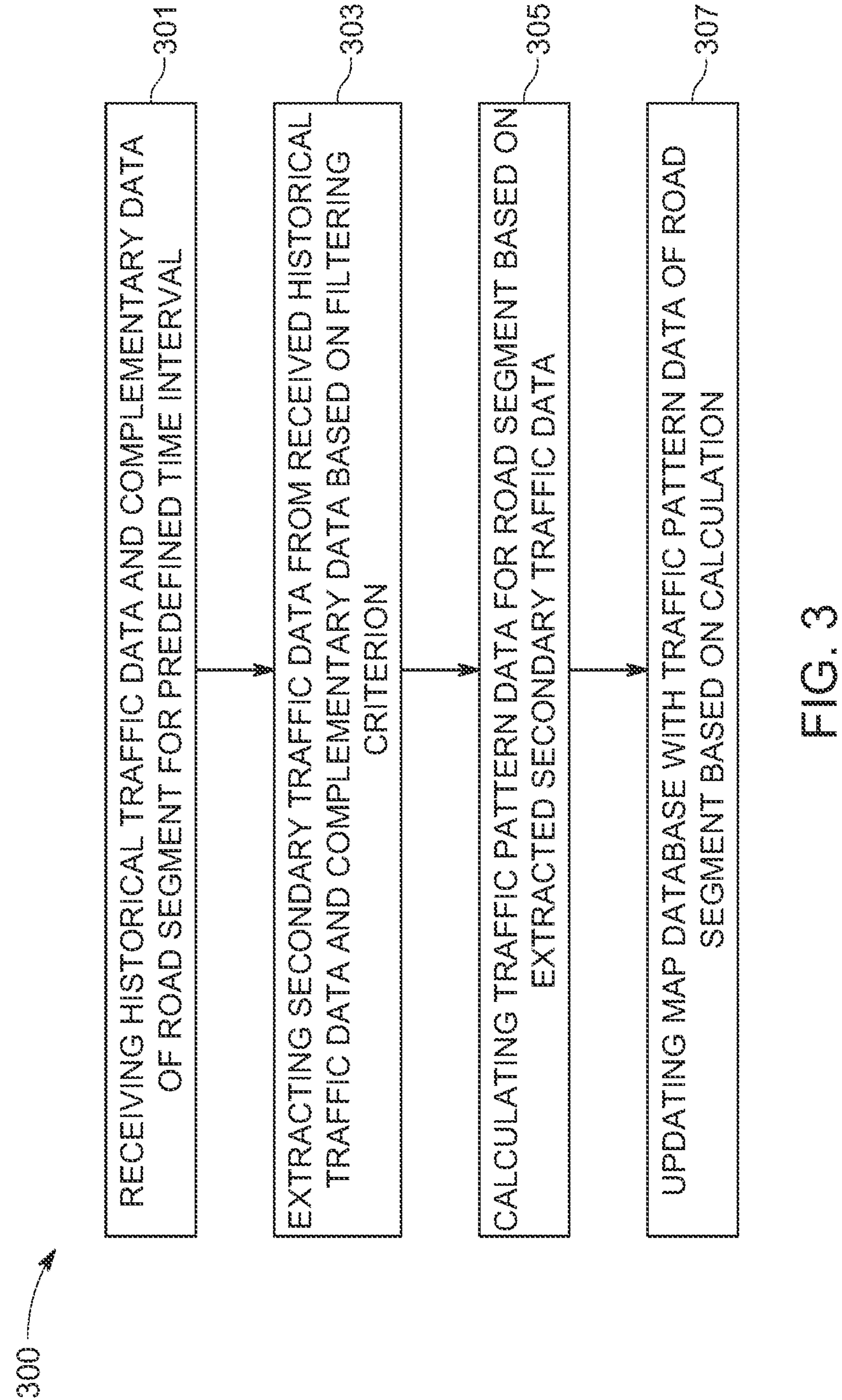
FIG. 3 illustrates a flowchart of a method for calculating traffic pattern data for a road segment, in accordance with an example embodiment.

FIG. 3 illustrates a flowchart 300 of a method for calculating the traffic pattern data 111 for a road segment, in accordance with an example embodiment. It will be understood that each block of the flow diagram 300 of the method may be implemented by various means, such as hardware, firmware, processor, circuitry, and/or other communication devices associated with execution of software including one or more computer program instructions. For example, one or more of the procedures described above may be embodied by computer program instructions.

The method 300 illustrated by the flowchart diagram 300 of FIG. 3 may include fewer, more, or different steps than the steps mentioned below.

At step 301, the method includes receiving the historical traffic data 113 and the complementary data 115 for a road segment of the plurality of road segments for the predefined time window. In an embodiment, the predefined time window corresponds to duration of at least 3 weeks. The historical traffic data 113 includes real time speed data of the one or more vehicle probes 105*a* (as explained in FIG. 1A and FIG. 1B). In addition, the complementary data 115 corresponds to the calendar event data and the non-recurring incident data as explained in FIG. 1B and FIG. 2. The historical traffic data 113 and the complementary data 115 are received for the duration of at least 3 weeks. For example, if the traffic pattern data 111 needs to be calculated for 8th of December (Thursday) for the time epoch of 15 minutes, between 10 am to 10:15 am, then from previous 3 weeks data (the historical traffic data 113 and the complementary data 115) starting from 17th November till 7th December, every Thursday's traffic data is utilized for the time epoch between 10 am to 10:15 am for calculation of the traffic pattern data 111. In addition, out of the previous 3 weeks, first week is from 1st December to 7th December, second week is from 24th November to 30th November and third week is from 17th November to 23rd November.

At step 303, the method 300 includes extracting the secondary traffic data 118 from the received historical traffic data 113 and the complementary data 115 based on the filtering criterion. The filtering criterion includes exclusion of the complementary data 115 and the historical traffic data 113 that is associated with the traffic confidence value that is less than or equal to the predefined traffic confidence threshold. In addition, the secondary traffic data 118 includes the historical traffic data 113 associated with the traffic confidence value more than the predefined threshold (explained in detail in FIG. 1B and FIG. 2).

At step 305, the method 300 includes calculating the traffic pattern data 111 for the road segment, based on the extracted secondary traffic data 209. The traffic pattern data 111 includes but may not be limited to the speed value and the traffic congestion parameter value. For calculating the traffic pattern data 111, the method further includes determining the advancing time interval for the predefined time window, based on the one or more attributes of the road segment. The method 300 further includes advancing the predefined time window by the determined advancing time interval. The advancing time interval is determined using the time window advance clock 207. The traffic pattern data 111 is calculated based on the advancement. (Explained in detail in FIG. 2).

At step 307, the method includes updating map of the road segment present in the map database 103*a* of the mapping platform 103 with the traffic pattern data 111 of the road segment, based on the calculation performed in step 305. The traffic pattern data 111 includes but may not be limited to the speed value and the traffic congestion parameter value. The speed value corresponds to average speed of one or more vehicles travelling on the road segment. The updated map of the road segment is further utilized by one or more entities for travelling purposes. The one or more entities include but may not be limited to drivers of one or more vehicles travelling on the road segment, logistic providers, and the like.

The method 300 may be implemented using corresponding circuitry. For example, the method 300 may be implemented by the traffic pattern data calculation system 101 comprising a processor, a memory, and a communication interface of the kind discussed in conjunction with FIG. 4.

Referring again to FIG. 1A, in some other embodiments, the system 101 may be the OEM cloud, such as the OEM cloud 109. The OEM cloud 109 may be configured to anonymize any data received from the traffic pattern data calculation system 101, before using the data (such as the historical traffic data and the complementary data) for further processing, such as before sending the data to the mapping platform 103. In some embodiments, anonymization of data may be done by the mapping platform 103.

The mapping platform 103 may comprise the map database 103*a* for storing map data and the processing server 103*b*. The map database 103*a* may include data associated with vehicle's accidents on road/s, one or more of a road sign, or speed signs, or road objects on the link or path. Further, the map database 103*a* may store accident data, node data, road segment data, link data, point of interest (POI) data, link identification information, heading value records, or the like. Also, the map database 103*a* further includes speed limit data of each lane, cartographic data, routing data, and/or maneuvering data. Additionally, the map database 103*a* may be updated dynamically to cumulate real time traffic conditions based on prediction of vehicle's accident. The real-time traffic conditions may be collected by analyzing the location transmitted to the mapping platform 103 by a large number of road users travelling by vehicles through the respective user devices of the road users. In one example, by calculating the speed of the road users along a length of road, the mapping platform 103 may generate a live traffic map, which is stored in the map database 103*a* in the form of real time traffic conditions based on prediction of vehicle's accident. In one embodiment, the map database 103*a* may further store historical traffic data that includes travel times, accident prone areas, areas with least and maximum accidents, average speeds and probe counts on each road or area at any given time of the day and any day of the year. According to some example embodiments, the road segment data records may be links or segments representing roads, streets, or paths, as may be used in calculating a route or recorded route information for determination of one or more personalized routes to avoid a zone/route with the predicted accident. The node data may be end points corresponding to the respective links or segments of road segment data. The road link data and the node data may represent a road network used by vehicles such as cars, trucks, buses, motorcycles, and/or other entities. Optionally, the map database 103*a* may contain path segment and node data records, such as shape points or other data that may represent pedestrian paths, links, or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103*a* may also store data about the POIs and their respective locations in the POI records. The map database 103*a* may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103*a* may include event data (e.g., traffic incidents, construction activities, scheduled events, unscheduled events, vehicle accidents, diversions etc.) associated with the POI data records or other records of the map database 103*a* associated with the mapping platform 103. Optionally, the map database 103*a* may contain path segment and node data records or other data that may represent pedestrian paths or areas in addition to or instead of the autonomous vehicle road record data. In an embodiment, the map database 103*a* may be a source-available document-oriented database.

In some embodiments, the map database 103*a* may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services in an event of a predicted vehicle's accident, such as route calculation, route guidance, map display, speed calculation, distance and travel time functions, and other functions, by a navigation device, such as by the traffic pattern data calculation system 101. The navigation-related functions may correspond to vehicle navigation, pedestrian navigation, or other types of navigation to avoid a zone where the vehicle accident has been predicted by the traffic pattern data calculation system 101. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 103*a* may be a master geographic database, but in alternate embodiments, the map database 103*a* may be embodied as a client-side map database and may represent a compiled navigation database that may be used in the traffic pattern data calculation system 101 to provide navigation and/or map-related functions in an event of a predicted vehicle's accident. For example, the map database 103*a* may be used with the traffic pattern data calculation system 101 to provide an end user with navigation features. In such a case, the map database 103*a* may be downloaded or stored locally (cached) on the traffic pattern data calculation system 101.

The processing server 103*b* may comprise processing means, and communication means. For example, the processing means may comprise one or more processors configured to process requests received from the traffic pattern data calculation system 101. The processing means may fetch map data from the map database 103*a* and transmit the same to the traffic pattern data calculation system 101 via the OEM cloud 109 in a format suitable for use by the traffic pattern data calculation system 101. In one or more example embodiments, the mapping platform 103 may periodically communicate with the traffic pattern data calculation system 101 via the processing server 103*b* to update a local cache of the map data stored on the traffic pattern data calculation system 101. Accordingly, in some example embodiments, the map data may also be stored on the traffic pattern data calculation system 101 and may be updated based on periodic communication with the mapping platform 103.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an example, the mapping platform 103 may be integrated into a single platform to provide a suite of mapping and navigation related applications for OEM devices, such as the user devices and the traffic pattern data calculation system 101. The traffic pattern data calculation system 101 may be configured to communicate with the mapping platform 103 over the network 105. Thus, the mapping platform 103 may enable provision of cloud-based services for the traffic pattern data calculation system 101, such as, storing the lane marking observations in an OEM cloud in batches or in real-time.

Figure 4:
FIG. 4 illustrates a block diagram of the traffic pattern data calculation system, in accordance with an example embodiment.
Figure 4:
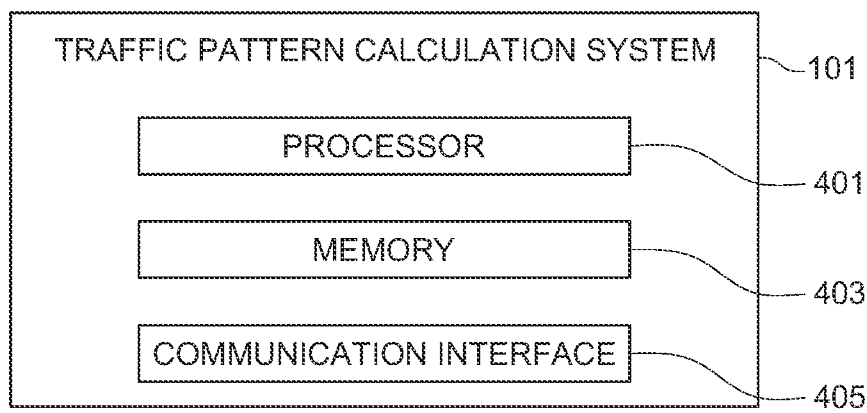

FIG. 4 illustrates a block diagram 400 of the traffic pattern data calculation system 101, in accordance with an example embodiment. The traffic pattern data calculation system 101 includes the processor 401, the memory 403, and a communication interface 405.

The processor 401 is configured to perform some or each of the operations of the method 300 described above in FIG. 1A, FIG. 1B, FIG. 2 and FIG. 3. The processor 401 may, for example, be configured to perform the operations (301-307) by performing hardware implemented logical functions, executing stored instructions, or executing algorithms for performing each of the operations. Alternatively, the traffic pattern data calculation system 101 may comprise means for performing each of the operations described above. In this regard, according to an example embodiment, examples of means for performing operations (301-307) may comprise, for example, the processor 401 which may be implemented in the traffic pattern data calculation system 101 and/or a device or circuit for executing instructions or executing an algorithm for processing information as described above.

In an example embodiment, the processor 401 may be in communication with the memory 403 via a bus for passing information among components coupled to the traffic pattern data calculation system 101. The memory 403 may be non-transitory and may include, for example, one or more volatile and/or non-volatile memories. In other words, for example, the memory 403 may be an electronic storage device (for example, a computer readable storage medium) comprising gates configured to store data (for example, bits) that may be retrievable by a machine (for example, a computing device like the processor 401). The memory 403 may be configured to store information, data, content, applications, instructions, or the like, for enabling the apparatus to carry out various functions in accordance with an example embodiment of the present invention. For example, the memory 403 may be configured to buffer input data for processing by the processor 401. The memory 403 may be solid-state memory, a hard disk drive (HDD), read-only memory (ROM), random-access memory (ROM), flash memory or another type of memory. For example, memory 403 may be configured to store computer program instructions which, when executed by processor 101*a*, cause the traffic pattern data calculation system 101 to perform the method 300 as described in FIG. 3. The memory 403 may be configured to store instructions for execution by the processor 401.

As such, whether configured by hardware or software methods, or by a combination thereof, the processor 401 may represent an entity (for example, physically embodied in circuitry) capable of performing operations according to an embodiment of the present invention while configured accordingly. Thus, for example, when the processor 401 is embodied as an ASIC, FPGA or the like, the processor 401 may be specifically configured hardware for conducting the operations described herein. Alternatively, as another example, when the processor 401 is embodied as an executor of software instructions, the instructions may specifically configure the processor 401 to perform the algorithms and/or operations described herein when the instructions are executed. However, in some cases, the processor 401 may be a processor specific device (for example, a mobile terminal or a fixed computing device) configured to employ an embodiment of the present invention.

In an example embodiment, the traffic pattern data calculation system 101 may be embodied in one or more of several ways as per the required implementation. For example, the traffic pattern data calculation system 101 may be embodied as a cloud-based service or a cloud-based platform. In each of such embodiments, the traffic pattern data calculation system 101 may be communicatively coupled to the components shown in FIG. 1A to carry out the desired operations and wherever required modifications may be possible within the scope of the present disclosure.

The traffic pattern data calculation system 101 may be accessed using the communication interface 405. The communication interface 405 may provide an interface for accessing various features and data stored in the traffic pattern data calculation system 101. The communication interface 405 may comprise input interface and output interface for supporting communications to and from the traffic pattern data calculation system 101 or any other component with which the traffic pattern data calculation system 101 may communicate. The communication interface 405 may be any means such as a device or circuitry embodied in either hardware or a combination of hardware and software that is configured to receive and/or transmit data to/from the one or more sources 105 in communication with the traffic pattern data calculation system 101. In this regard, the communication interface 405 may include, for example, an antenna (or multiple antennae) and supporting hardware and/or software for enabling communications with a wireless communication network. Additionally, or alternatively, the communication interface 405 may include the circuitry for interacting with the antenna(s) to cause transmission of signals via the antenna(s) or to handle receipt of signals received via the antenna(s). In some environments, the communication interface 405 may alternatively or additionally support wired communication. As such, for example, the communication interface 405 may include a communication modem and/or other hardware and/or software for supporting communication via cable, digital subscriber line (DSL), universal serial bus (USB) or other mechanisms. In some embodiments, the communication interface 405 may enable communication with a cloud-based network to enable deep learning.

In this way, example embodiments of the invention result in calculating accurate traffic pattern data 111 for the road segment for the predefined time window and for a particular time epoch. The traffic pattern data calculation system 101 also enables update of the map database 103*a* based on the calculated traffic pattern data 111.

In some example embodiments, a computer programmable product may be provided. The computer programmable product may comprise at least one non-transitory computer-readable storage medium having stored thereon computer-executable program code instructions that when executed by a computer, cause the computer to execute the method 300.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A traffic pattern data calculation system, comprising:

at least one non-transitory memory configured to store computer executable instructions; and at least one processor configured to execute the computer executable instructions to:

receive, for a road segment, historical traffic data from a plurality of vehicle probes and complementary data from one or more external data sources, for a predefined most-recent time window;

extract, from the received historical traffic data and the complementary data, secondary traffic data based on a filtering criterion;

calculate, for the road segment, traffic pattern data, based on the extracted secondary traffic data; and update a map database with the traffic pattern data of the road segment for the predefined most-recent time window, based on the calculation; and cause a mapping platform routing engine to generate navigation instructions based on the updated map database.

2. The traffic pattern data calculation system of claim 1, wherein the at least one processor is further configured to:

determine an advancing time interval for the predefined most-recent time window, based on one or more attributes of the road segment;

advance the predefined most recent time window by the determined advancing time interval; and calculate updated traffic pattern data for the road segment based on the advanced predefined most-recent time window.

3. The traffic pattern data calculation system of claim 1, wherein the filtering criterion comprises at least one of:

complementary data that is calendar event data;

complementary data that is a non-recurring incident data; and the historical traffic data that is associated with a traffic confidence value that is less than or equal to a predefined traffic confidence threshold.

4. The traffic pattern data calculation system of claim 3, wherein to extract the secondary traffic data based on the filtering criterion, the at least one processor is configured to:

exclude the historical traffic data corresponding to the complementary data; and combine the historical traffic data associated with the traffic confidence value more than the predefined traffic confidence threshold.

5. The traffic pattern data calculation system of claim 4, wherein the combining comprises an arithmetic averaging based on a recurrent formula.

6. The traffic pattern data calculation system of claim 1, wherein the traffic pattern data comprises a speed value.

7. The traffic pattern data calculation system of claim 1, wherein the traffic pattern data comprises a traffic congestion parameter value.

8. The traffic pattern data calculation system of claim 1, wherein the one or more attributes of the road segment comprise at least one of: a functional classification of the road segment or a controlled access limitation associated with the road segment.

9. A method for calculation of a traffic pattern data, the method comprising:

receiving, for a road segment, historical traffic data from a plurality of vehicle probes and complementary data from one or more external data sources, for a predefined most-recent time window;

extracting, from the received historical traffic data and the complementary data, secondary traffic pattern data based on a filtering criterion;

calculating, for the road segment, the traffic pattern data, based on the extracted secondary traffic data; and update a map database with the traffic pattern data of the road segment for the predefined most-recent time window, based on the calculation; and cause a mapping platform routing engine to generate navigation instructions based on the updated map database.

10. The method of claim 9, further comprising:

determining an advancing time interval for the predefined most-recent time window, based on one or more attributes of the road segment;

advancing the predefined most-recent time window by the determined advancing time interval; and calculating updated traffic pattern data for the road segment based on the advanced predefined most-recent time window.

11. The method of claim 9, wherein the filtering criterion comprises at least one of:

complementary data that is calendar event data;

complementary data that is a non-recurring incident data; and the historic traffic data that is associated with a traffic confidence value that is less than or equal to a predefined traffic confidence threshold.

12. The method of claim 11, wherein extracting the secondary traffic data based on the filtering criterion comprises:

excluding the historical traffic data corresponding to the complementary data; and combining the historical traffic data associated with the traffic confidence value more than the predefined traffic confidence threshold.

13. The method of claim 12, wherein the combining comprises an arithmetic averaging based on a recurrent formula.

14. The method of claim 9, wherein the traffic pattern data comprises a speed value and a traffic congestion parameter value.

15. The method of claim 9, wherein the one or more attributes of the road segment comprise at least one of: a functional classification of the road segment or a controlled access limitation associated with the road segment.

16. A computer programmable product comprising a non-transitory computer readable medium having stored thereon computer executable instruction which when executed by one or more processors, cause the one or more processors to carry out operations for calculating traffic pattern data, the operations comprising:

receiving, for a road segment, historical traffic data from a plurality of vehicle probes and complementary data from one or more external data sources, for a predefined most-recent time window;

extracting, from the received historical traffic data and the complementary data, secondary traffic data based on a filtering criterion;

calculating, for the road segment, the traffic pattern data, based on the extracted secondary traffic data; and updating a map database with the traffic pattern data of the road segment for the predefined most-recent time window, based on the calculation; and causing a mapping platform routing engine to generate navigation instructions based on the updated map database.

17. The computer programmable product of claim 16, wherein the operations further comprise:

advancing the predefined most-recent time window by the determined advancing time interval; and calculating updated traffic pattern data for the road segment based on the advanced predefined most-recent time window.

18. The computer programmable product of claim 16, wherein the filtering criterion comprises at least one of:

complementary data that is calendar event data;

complementary data that is a non-recurring incident data; and the historical traffic data that is associated with a traffic confidence value that is less than or equal to a predefined traffic confidence threshold.

19. The computer programmable product of claim 18, wherein the combining comprises an arithmetic averaging based on a recurrent formula.

20. The computer programmable product of claim 16, wherein the traffic pattern data comprises a speed value.

* * * * *